Figure 1:
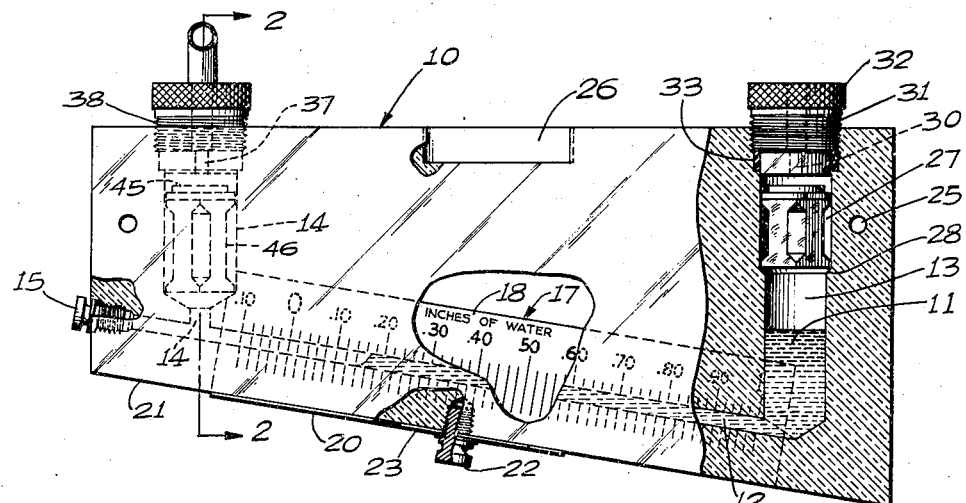

Oct. 18, 1949.  F. W. DWYER  2,485,437
PRESSURE GAUGE
Filed Feb. 17, 1945

INVENTOR.
Frank W. Dwyer
BY Mann and Brown
Attys.

Patented Oct. 18, 1949

2,485,437

UNITED STATES PATENT OFFICE 2,485,437

PRESSURE GAUGE

Frank W. Dwyer, Chicago, Ill.

Application February 17, 1945, Serial No. 578,475

5 Claims. (Cl. 137—69)

My invention relates to pressure gauges with particular reference to gauges of the manometer type and is directed specifically to an improved valve arrangement for preventing escape of liquid from the gauge.

A manometer consisting of a generally U-shaped tube containing a liquid for pressure indications may when subjected inadvertently to excessive pressure differential discharge its liquid from one of its two legs. Even with care on the part of a skillful operator, an undue pressure differential will be created from time to time especially in the use of sensitive pressure gauges employing liquids of low specific gravity.

The loss of the liquid itself may be important since the device is useless until it is replaced. Usually, however, the inconvenience or damage caused by the discharged liquid is the more important penalty, especially when it becomes necessary to dismantle pipe lines and devices under test to remove the liquid from the passages therein. Such dismantling takes time and many of these devices are employed at military installations where time is pressing.

The general object of the present invention is to provide a valve that will seal the end of a liquid-containing manometer passage whenever an excessive pressure differential tends to expel the liquid from the passage. This general object is attained by providing a valve means to seal the passage and by employing a float to cause the valve to close automatically in response to excessive rise of the liquid level in the passage.

The automatic valve opens in response to gravity when the excessive pressure differential ceases and permits the liquid level to drop away from the valve. If a nonmetallic liquid of low specific gravity is employed for the sake of accurately measuring relatively low pressure differences, the requirement for buoyancy on the part of the valve structure limits to a very low magnitude the weight that may be provided for the gravitational opening of the valve. An important object of my invention is to insure under this limitation gravitational opening of the automatic valve without fail. It is contemplated herein that a number of expedients will be employed concurrently to insure the gravitational opening.

One of these expedients is to minimize the tendency of the sealing surfaces of the valve to adhere together when the sealing pressure exerted by the gauge liquid is removed. This end is accomplished in part by minimizing the area of the mutually contacting surfaces.

Another expedient characterizing the preferred practice of my invention is to minimize the drag of the valve parts on the surrounding stationary walls, with special attention to the cork body or other means that may be employed as the float. The tendency of moving parts to cling to the surrounding stationary walls arises from a capillary action on the part of the liquid which is employed in the manometer and which tends to coat a moving part. This particular end is attained by making the movable valve parts of substantially smaller cross section than the valve passage or chamber and by making the float of a configuration that limits such dragging contact with the walls to only minor areas of the float periphery.

A third expedient may be generally described as making the valve means in separable parts, the valve being designed to open either by bodily movement as a whole away from its closed position or by gravitational separation of its parts if the valve sticks in closed position when the liquid level drops.

The above and other objects and advantages of my invention will be apparent in the following detailed description taken with the accompanying drawings.

Figure 2:
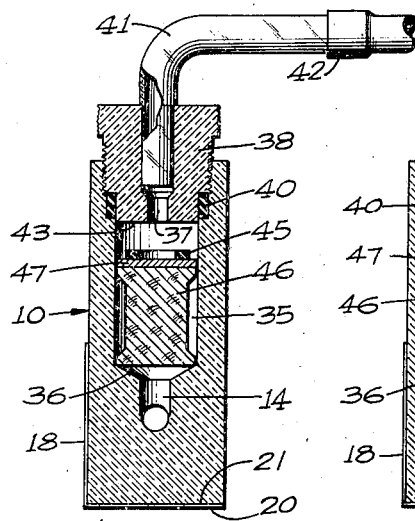
Figure 3:
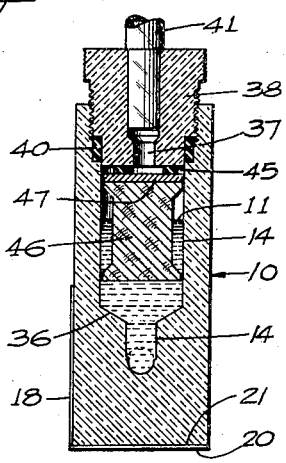
Figure 4:
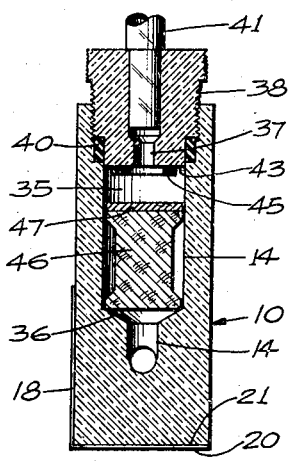
Figure 5:
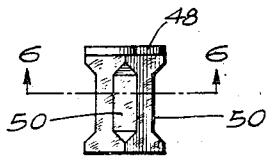
Figure 6:
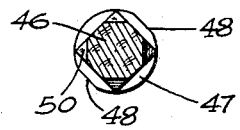

In the drawings, which are to be regarded as merely illustrative;

Figure 1 is a front elevation of the essential parts of a manometer incorporating the preferred form of the present invention, the figure being partly broken away and being partly in section, Figure 2 is a transverse section on an enlarged scale taken on the line 2—2 of Figure 1 with the automatic valve in normal open position, Figure 3 is a similar view with the valve closed, Figure 4 is a similar view showing the valve after opening by gravitational separation of its constituent parts, Figure 5 is a side elevation of parts shown in Figure 2, and Figure 6 is a horizontal section taken as indicated by the line 6—6 of Figure 5.

The invention may be incorporated in any type of manometer. By way of example, the drawings show a manometer formed out of a block 10 of suitable transparent plastic material, the block being bored to confine a quantity of indicating liquid 11 in a body of generally U-shaped configuration. As indicated in Figure 1, the block 10 is bored to form an inclined passage 12 and two vertical passages or legs 13 and 14, the bore forming the inclined passage 12 being closed at its outer end by a suitable plug 15.

A scale for the gauge may be provided in the form of a piece of sheet metal generally designated 17 bent to angular configuration to provide a vertical portion 18 bearing suitable indicia and to form a lower flange portion 20, the vertical portion lying against the rear face of the block 10 and the lower flange portion lying against the inclined lower face 21 of the block. For adjustably holding the scale in position a suitable thumb screw 22 is threaded into the bottom of the block 10, the thumb screw extending through a longitudinal slot 23 in the lower flange portion 20.

The block 10 may be supported for use by any suitable means, for example by screws (not shown) extending through screw holes 25 in the block. Figure 1 shows a recess 26 in the block in which a spirit level may be mounted, if desired.

The leg or upwardly extending passage 13 may be of relatively large diameter as indicated to serve as a liquid reservoir. The upper end of this passage is enlarged to form a valve passage or chamber 27, the lower end of which is defined by an annular shoulder 28 having a conical surface. At the upper end of the valve passage 27 is a port 30 that may serve either as a vent to the atmosphere or as means for connecting the gauge to various devices for pressure-measuring purposes. In my preferred construction, the port 30 is provided by a bore in a threaded bushing 31 having a knurled periphery 32, the bushing being provided with a suitable packing ring 33.

The other leg or upwardly extending passage 14 of the manometer may also be enlarged to form a valve passage or valve chamber 35 with a conical shoulder 36 at its lower end. The valve chamber 35 is provided with a suitable port 37 and here again the port may be a bore in a bushing 38, the bushing being encircled by the packing ring 40. The drawings show a suitable L-shaped tube 41 of rigid material mounted in the bushing 38, the tube being releasably embraced by the end portion of a rubber tube 42 for the purpose of making a pressure measurement. Each of the two valve chambers 27 and 35 houses a valve assembly illustrating the present invention. Since the two assemblies are alike, it will suffice to describe only the valve assembly in the valve chamber 35.

For cooperation with the valve assembly it is necessary to provide a suitable valve seat. In the present arrangement, the valve seat is provided by the inner face 43 of the bushing 38 surrounding the port 37. For sealing action against this downwardly presented valve seat, I may employ a suitable sealing ring or valve ring 45 preferably of rubber or the like. By making this sealing ring 45 of relatively small radial dimension, I provide a relatively small annular sealing surface for contact with the valve seat 43. Preferably the sealing ring 45 has freedom for movement in the valve chamber 35 and it will be noted that the sealing ring is substantially smaller in diameter than the valve chamber in which it is housed so that the sealing ring can make contact with the chamber wall at only one point on the circumference of the sealing ring.

Below the sealing ring 45 is a float body 46 of cork or other suitable light material which normally rests on the conical shoulder 36, as indicated in Figure 2, but is carried upward for valve closing action whenever the liquid rises a substantial distance into the valve chamber 35. The float is provided with a suitable valve surface for pressure contact against the sealing ring 45 to close the port 37 against the egress of the indicating liquid and the float is suitably weighted to cause a pronounced gravitational tendency for the valve surface to drop away from the sealing ring 45. In the present construction, a metal disc 47 is employed for the dual purpose of providing the required sealing surface and of providing the required weight, the metal disc being cut away at its periphery as indicated by way of example at 48 in Figure 6 to permit air or gas to move freely towards and away from the port 37. The metal disc 47 may be fixed to the upper end of the float 46 but I prefer merely to rest the disc loosely on the float.

To minimize the peripheral area of the float body 46 that may contact the surrounding cylindrical wall of the valve chamber and thereby to minimize the possibility of dragging resistance to gravitational movement of the float body, I prefer to use a float body of non-circular cross-sectional configuration, for example polygonal cross-sectional configuration. For further minimizing the peripheral area of the float body that may drag against the valve chamber wall, I prefer additionally to make a substantially vertical portion of the float body of substantially smaller cross-sectional area than the valve chamber. The float body 46, shown by way of example, may be formed by first cutting a piece of cork to a rectangular block of square cross-sectional configuration dimensioned for loosely fitting in the cylindrical valve chamber 35. The vertical corner edges of the rectangular cork block are then cut away as indicated at 50 in Figures 5 and 6 to give the portion of the cork body intermediate its upper and its lower ends an octagonal configuration of substantially less cross dimension than the valve chamber. It is apparent that forming a float body in the described manner results in a finished float that can make contact with the valve chamber at only eight points, four at its upper end and four at its lower end. Preferably the cork body is dimensioned for a sufficiently loose fit to make it impossible for the float to drag on the chamber wall at only four points, two of the four points being at the upper end of the float and the other two being at the lower end of the float.

The operation of the automatic valve may be readily understood from the foregoing description. When a pressure differential causes the indicating liquid to rise to an excessive degree in the valve chamber 35, the float 46 is carried upward by the liquid to the closed position shown in Figure 3, the buoyancy of the float creating sufficient pressure on the part of the disc 47 against the sealing ring 45 and in turn against the valve seat 43 to form a fluid-tight seal against escape of the indicating liquid.

When the excessive pressure differential ceases and permits lowering of the liquid column in the valve chamber 35, there is a gravitational tendency for the valve means to move bodily as a whole to the open position of Figure 2 under the force of gravity. If, however, the valve tends to stick in closed position because of adhesion of the sealing ring 45 against the valve seat 43, the valve means will separate by gravitation of the metal disc 47 away from the sealing ring 45, as shown in Figure 4. This gravitational separation of the valve parts opens the port 37 as effectively as downwardly movement of the sealing ring 45 away from the valve seat. The surface of the metal disc is preferably smooth and polished to favor separation from the sealing ring.

It will be apparent to those skilled in the art that various changes and substitutions may be made in the above-described embodiment of my invention without departing from the scope of my appended claims.

I claim:

1. A float valve device for preventing the escape of liquid from a valve casing having an upwardly extending passage provided at its upper end with a ported valve seat and containing a column of non-metallic liquid movable toward said valve seat, said float valve device comprising the combination of a float body movable in said passage in response to rise of the liquid column therein and a valve assembly for closing said port when the float body is moved by the liquid column to the upper limit permitted by said valve seat and for opening the port when the float body falls below said limit, said valve assembly including means superposed on the float body providing an upwardly facing sealing surface and including a disc having greater specific gravity than the float body and including also a resilient sealing ring positioned above the disc, disconnected therefrom, and having an open hole therein for establishing communication between the passage and the valve seat port when not engaged by said sealing surface and adapted to be engaged in sealing relation by said sealing surface when the float body is at its upper limit.

2. A float valve device for preventing the escape of liquid from a valve casing having an upwardly extending passage provided at its upper end with a ported outlet having a downwardly facing valve seat and containing a column of non-metallic liquid movable toward said valve seat, said float valve device comprising the combination of a float body movable in said passage in response to rise of the liquid column therein and a valve assembly for closing said port when the float body is moved by the liquid column to the upper limit permitted by said valve seat and for opening the port when the float body falls below said limit, said valve assembly including a loose sealing ring for contact with said seat and a float-actuated means disconnected from said ring and having an upper surface for spanning the ring to cooperate therewith in sealing off the port from the passage.

3. A float valve device for preventing the escape of liquid from a valve casing having an upwardly extending passage provided at its upper end with a ported outlet having a downwardly facing valve seat and containing a column of non-metallic liquid movable toward said valve seat, said float valve device comprising the combination of a float body movable in said passage in response to rise of the liquid column therein and a valve assembly for closing said port when the float body is moved by the liquid column to the upper limit permitted by said valve seat and for opening the port when the float body falls below said limit, said valve assembly including a sealing ring for said seat, and an imperforate metal disc disconnected from the float body but carried thereby to cooperate with the ring for sealing off the port from the passage.

4. A float valve device for preventing the escape of liquid from a valve casing having an upwardly extending cylindrically walled passage provided at its upper end with a ported outlet having a downwardly facing valve seat and containing a column of liquid movable toward said valve seat, said float valve device comprising the combination of a float body movable in said passage in response to rise of the liquid column therein and a valve assembly for closing said port when the float body is moved by the liquid column to the upper limit permitted by said valve seat and for opening the port when the float body falls below said limit, said valve assembly including a loose sealing ring for contact with said seat carried by but disconnected from the float body and an imperforate metal member carried by the float body between the float body and the sealing ring to cooperate with said ring for sealing off said port, the float body being of non-circular configuration for minimizing dragging contact with the cylindrical wall of the passage.

5. A float valve device for preventing the escape of liquid from a valve casing having an upwardly extending cylindrically walled passage provided at its upper end with a ported outlet having a downwardly facing valve seat and containing a column of liquid movable toward said valve seat, said float valve device comprising the combination of a float body movable in said passage in response to rise of the liquid column therein and a valve assembly for closing said port when the float body is moved by the liquid column to the upper limit permitted by said valve seat and for opening the port when the float body falls below said limit, said valve assembly including a loose sealing ring for contact with said seat carried by but disconnected from the float body and an imperforate metal member carried by the float body between the float body and the sealing ring to cooperate with said ring for sealing off said port, the float body being reduced in cross section intermediate its ends to avoid contact of said intermediate portion with the cylindrical wall of the passage and being of non-circular configuration at its upper and lower ends for minimizing dragging contact with said cylindrical wall.

FRANK W. DWYER.

REFERENCES CITED

The following references are of record in the file of this patent:

UNITED STATES PATENTS

| Number | Name | Date |
| --- | --- | --- |
| 42,541 | Sees | Apr. 26, 1864 |
| 701,428 | Walsh | June 3, 1902 |
| 725,640 | Wemmer | Apr. 14, 1903 |
| 1,354,023 | Cornett et al. | Sept. 28, 1920 |
| 1,667,877 | Starr | May 1, 1928 |
| 1,758,077 | Fentress | May 13, 1930 |
| 1,790,044 | Francis | Jan. 27, 1931 |
| 1,832,266 | Thomas | Nov. 17, 1931 |
| 2,156,865 | Parks | May 2, 1939 |
| 2,325,956 | Holtman | Aug. 3, 1943 |
| 2,331,153 | Ackley | Oct. 5, 1943 |
| 2,331,431 | Simoneau | Oct. 12, 1943 |